US007636622B2

(12) United States Patent
Underdal et al.

(10) Patent No.: US 7,636,622 B2
(45) Date of Patent: Dec. 22, 2009

(54) INTERACTIVE SCHEMATIC GENERATING METHOD AND APPARATUS FOR A VEHICLE DIAGNOSTIC PROCEDURE

(75) Inventors: Olav M. Underdal, Kalamazoo, MI (US); Harry M. Gilbert, Portage, MI (US); Oleksiy Portyanko, Portage, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/452,272

(22) Filed: Jun. 14, 2006

(65) Prior Publication Data

US 2007/0294002 A1 Dec. 20, 2007

(51) Int. Cl.
*G01M 17/00* (2006.01)

(52) U.S. Cl. ............................. 701/29; 701/30; 701/32; 701/33; 701/34; 701/35

(58) Field of Classification Search .................... 701/33
See application file for complete search history.

(56) References Cited

U.S. PATENT DOCUMENTS

| | | | | |
|---|---|---|---|---|
| 4,866,635 A | | 9/1989 | Kahn et al. | |
| 5,742,500 A | | 4/1998 | Irvin | |
| 6,041,287 A | * | 3/2000 | Dister et al. | 702/182 |
| 6,055,468 A | * | 4/2000 | Kaman et al. | 701/29 |
| 6,141,608 A | * | 10/2000 | Rother | 701/33 |
| 6,192,302 B1 | | 2/2001 | Giles et al. | |
| 6,493,615 B1 | | 12/2002 | Johnston | |
| 2002/0138185 A1 | * | 9/2002 | Trsar et al. | 701/33 |
| 2006/0123692 A1 | * | 6/2006 | Beronja | 43/61 |
| 2007/0100520 A1 | * | 5/2007 | Shah et al. | 701/33 |

FOREIGN PATENT DOCUMENTS

DE 10233503 A1 2/2004

OTHER PUBLICATIONS

U.S. Appl. No. 11/052,118, filed Feb. 8, 2005, Fountain, et al.
European Search Report dated Jun. 20, 2008; 3 pgs.

* cited by examiner

*Primary Examiner*—Khoi Tran
*Assistant Examiner*—Bhavesh V Amin
(74) *Attorney, Agent, or Firm*—Baker & Hostetler LLP

(57) ABSTRACT

An interactive diagnostic schematic generator illustrates diagnostic test procedures for diagnosing failure modes of a vehicle. The schematic generator reads a schematic data file such as a wiring diagram from a computer memory, indicates a test subject in the schematic or illustrates a location where test equipment is to be connected, and formats the schematic for display on a display device. The schematic generator also receives feedback from a vehicle onboard computer, test equipment or user input indicating that the action has been performed, and removes the indication of the test subject in the schematic. The schematic generator further marks the test subject to indicate that the action has been performed with a marking style that is visually distinct from the indicating style, optionally indicating that the result has validated or invalidated the test subject.

23 Claims, 4 Drawing Sheets

INTERACTIVE SCHEMATIC GENERATING METHOD AND APPARATUS FOR A VEHICLE DIAGNOSTIC PROCEDURE

FIELD OF THE INVENTION

The present invention relates generally to diagnostic equipment. More particularly, the present invention relates to the generation of interactive diagnostic schematics for use with diagnostic test sequences, such as vehicle diagnostic test sequences, for diagnostic systems.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

However, existing diagnostic systems have a disadvantage in that the textual instructions can seem tedious or difficult to understand or interpret. Vehicle technicians often prefer visual aids that illustrate the diagnostic test procedures or steps. Accordingly, it is desirable to provide a method and apparatus for dynamically generating interactive diagnostic schematics to illustrate diagnostic test procedures for a vehicle in a format that can be executed on PC-based diagnostic systems.

SUMMARY OF THE INVENTION

The foregoing needs are met, to a great extent, by the present invention, wherein in one aspect an apparatus and method are provided that in some embodiments can dynamically generate interactive diagnostic schematics to illustrate diagnostic test procedures for a vehicle in a format that can be executed on a PC-based diagnostic system.

In accordance with one aspect of the present invention, a computer-implemented method of dynamically generating an interactive diagnostic schematic to illustrate a diagnostic test procedure for a vehicle can include reading a unit of schematic data associated with the diagnostic test procedure from a memory and indicating a first test subject in the schematic upon which a first action is required. In addition, the method can include preparing the schematic for display on a display device with the first test subject indicated.

In accordance with another aspect of the present invention, a computer program product for dynamically generating an interactive diagnostic schematic to illustrate a diagnostic test procedure for a vehicle, including a computer-readable medium encoded with instructions configured to be executed by a processor in order to perform predetermined operations that can include reading a unit of schematic data associated with the diagnostic test procedure from a memory and indicating a first test subject in the schematic upon which a first action is required. In addition, the predetermined operations can include preparing the schematic for display on a display device with the first test subject indicated.

In accordance with yet another aspect of the present invention, a diagnostic tool for dynamically generating an interactive diagnostic schematic to illustrate a diagnostic test procedure for a vehicle can include a schematic reader configured to read a unit of schematic data associated with the diagnostic test procedure from a memory and a test subject indicator configured to indicate a first test subject in the schematic upon which a first action is required. In addition, the diagnostic tool can include a diagnostic schematic formatter configured to prepare the schematic for display on a display device with the first test subject indicated.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
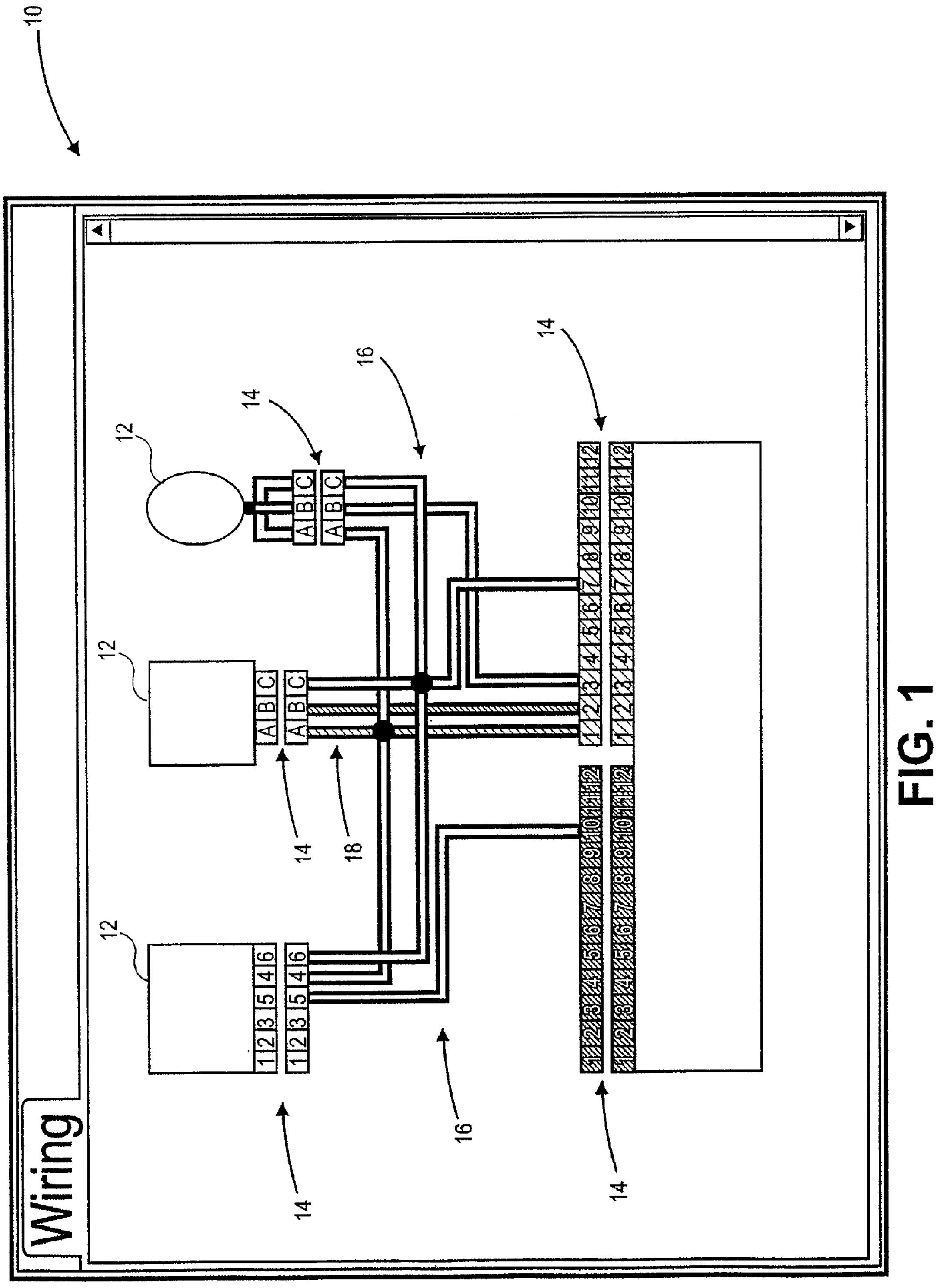
FIG. 1 is a schematic diagram illustrating an interactive diagnostic schematic that can be generated by an embodiment of the invention.

An embodiment in accordance with the present invention provides an interactive diagnostic schematic generator that can dynamically generate an interactive diagnostic schematic to illustrate a diagnostic test procedure for a vehicle. The interactive diagnostic schematic generator can include a schematic reader to read a schematic data file associated with a diagnostic test procedure from a computer memory. The schematic generator can also include a test subject indicator that can indicate a test subject, such as a vehicle subcomponent upon which a test procedure is to be performed, in the schematic.

In addition, the schematic generator can include a diagnostic schematic formatter that can format the schematic for display on a display device with the test subject indicated. Furthermore, the schematic generator can include a test equipment illustrator that can illustrate a location of a test equipment connection in the schematic. Moreover, the schematic generator can include a feedback receiver to receive feedback indicating when the test procedure has been performed so that the indication of the test subject in the schematic can be removed.

An embodiment of the interactive diagnostic schematic generator can complement or can be an integral part of a diagnostic test procedure generator. An example of a diagnostic test procedure generator that is compatible with the interactive diagnostic schematic generator is disclosed in copending U.S. Patent Application, entitled "Diagnostic Decision Sequencing Method and Apparatus for Optimizing a Diagnostic Test Plan," filed concurrently herewith by Fountain, et al., the disclosure of which is hereby incorporated by reference in its entirety.

The invention will now be described with reference to the drawing figures in which like reference numerals refer to like parts throughout. An embodiment of the present inventive method and apparatus can generate an interactive diagnostic schematic 10 such as that illustrated in FIG. 1. The interactive diagnostic schematic 10 can include any number of vehicle components 12. For example, the vehicle components 12 in FIG. 1 could represent a bank angle sensor, a throttle position sensor, a cam position sensor and an electronic control module, or any additional vehicle components related to the schematic 10.

The diagnostic schematic 10 can further include electrical connectors 14 for the vehicle components, for example, a bank angle sensor connector, a throttle position sensor connector, a cam position sensor connector, a first ECM connector and a second ECM connector, or any additional electrical connectors related to the schematic 10. In addition, the diagnostic schematic 10 can include any number of wires 16 coupling the vehicle components, as shown in FIG. 1.

In order to illustrate a diagnostic test procedure to a vehicle technician diagnosing a failure mode of a vehicle, the interactive diagnostic schematic 10 can highlight one or more items on the schematic 10, for example, the highlighted wires 18 shown in FIG. 1. Additionally, the diagnostic schematic 10 can animate an item on the schematic 10. For example, a vehicle component 12 or an electrical connector 14 can be shown blinking or flashing to indicate to the vehicle technician that the component 12 or connector 14 requires a test procedure action. Furthermore, the diagnostic schematic 10 can indicate connection locations for auxiliary test equipment, such as a digital multimeter (not shown).

Figure 2:
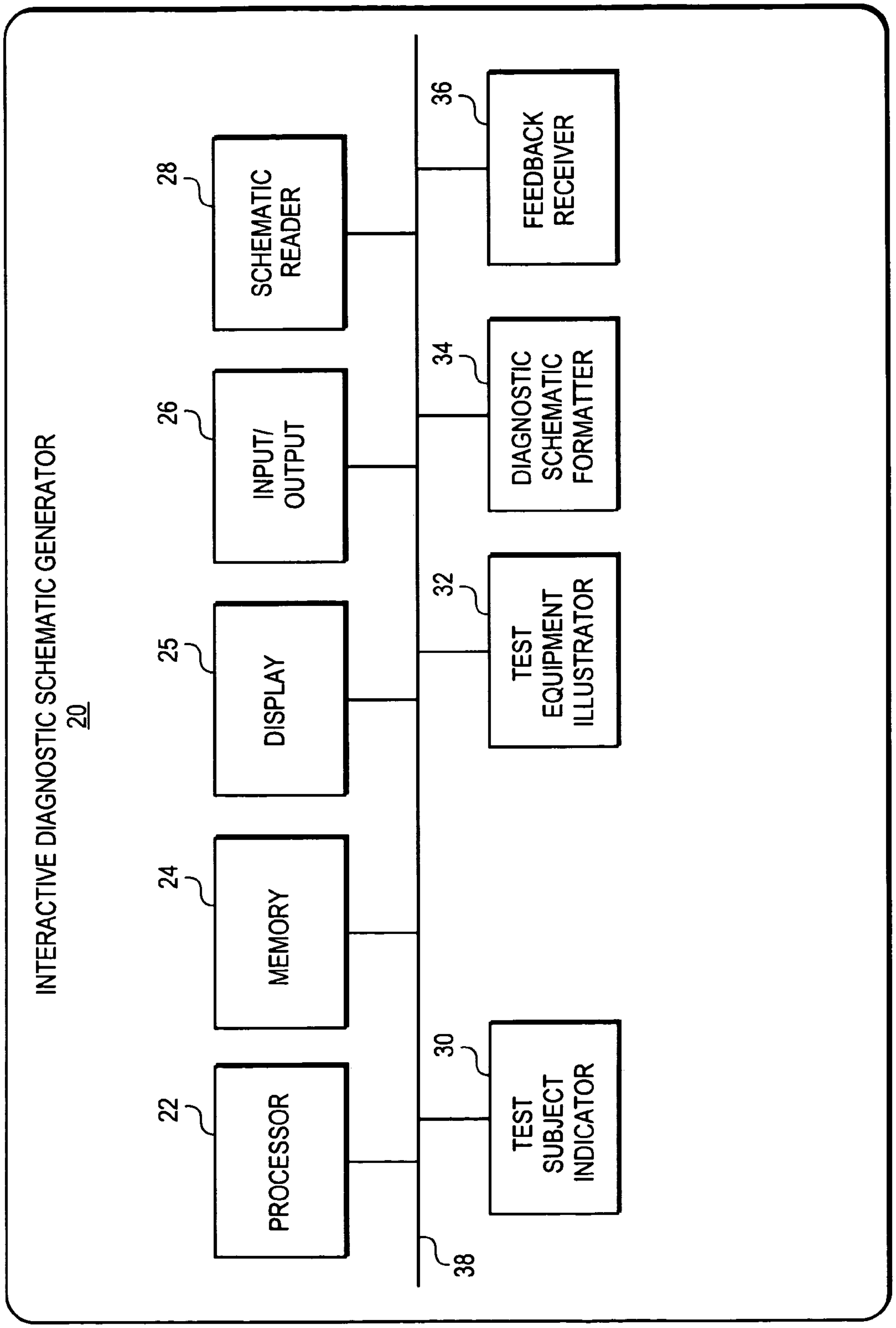
FIG. 2 is a block diagram illustrating an interactive diagnostic schematic generator according to an embodiment of the invention.

An embodiment of the present inventive method and apparatus is illustrated in FIG. 2, which shows an interactive diagnostic schematic generator 20. The interactive diagnostic schematic generator 20 can include a processor 22, a memory 24, a display device 25, an input/output device 26, a schematic reader 28, a test subject indicator 30, a test equipment illustrator 32, a diagnostic schematic formatter 34, and a feedback receiver 36, all of which are interconnected by a data link 38.

The processor 22, the memory 24 and the input/output device 26 can be part of a general computer, such as a personal computer (PC), a UNIX workstation, a server, a mainframe computer, a personal digital assistant (PDA), or some combination of these. Alternatively, the processor 22, the memory 24 and the input/output device 26 can be part of a specialized computing device, such as a vehicle diagnostics scan tool. The remaining components can include programming code, such as source code, object code or executable code, stored on a computer-readable medium that can be loaded into the memory 24 and processed by the processor 22 in order to perform the desired functions of the interactive diagnostic schematic generator 20.

In various embodiments, the system 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the system 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

An embodiment of the present invention can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

The schematic reader 28 can read a schematic data file associated with a diagnostic test procedure, such as a wiring diagram or other illustration data file. For example, the schematic reader 28 can read a data file from a main memory or from a peripheral memory device associated with the processor 22. In an embodiment of the invention, the schematic data file can be stored in a scalable vector graphics (SVG) file format, which is an XML-based markup language for describing two-dimensional vector graphics, both static and animated, (that is to say, either declarative or scripted). Thus, the schematic data file can be stored as a text file. SVG formatting can allow various types of graphic objects, for example, vector graphic shapes consisting of straight lines and curves and the areas bounded by them, raster graphics images or text. SVG formatting further allows graphical objects to be grouped, styled, transformed and composited into previously rendered objects. SVG formatting can also permit nested transformations, clipping paths, alpha masks, filter effects, template objects and extensibility. In addition, SVG formatting can enhance searchability and accessibility of the graphics.

SVG graphics can be dynamic and interactive. For example, the document object model (DOM) in SVG formatting can allow straightforward and efficient animation of graphics by way of script languages. The SVG graphics file format is also compatible with popular communications network standards, such as World Wide Web standards on the Internet. Additionally, SVG images can be stored using compression techniques.

SVG data files can be prepared for display on the display device 25 by any number of commercially available SVG viewers, such as the Adobe SVG Viewer, produced by Adobe Systems Incorporated of San Jose, Calif., or the Corel SVG Viewer, produced by the Corel Corporation of Ottawa, Canada.

The test subject indicator 30 can modify the schematic data file to indicate a test subject in the schematic. For example, the test subject indicator 30 can alter the color of a vehicle component, electrical connector, wire, or the like. Similarly, the test subject indicator 30 can highlight the test subject by surrounding the test subject with a highlighting color to make the test subject stand out from the background and the remaining items in the schematic.

Likewise, the test subject indicator 30 can shade the test subject, fade the color of the test subject, gray out the test subject, or animate the test subject. For example, the test subject indicator 30 can animate the test subject by making a component, electrical connector, wire, or the like, blink or flash in the schematic when displayed on the display device 25. This can be accomplished, for example, by adding executable code in a scripting language to the schematic data file.

Similarly, the test subject indicator 30 can animate the test subject by adding motion to the schematic, for example, demonstrating the connection or disconnection of an electrical connector. The test subject indicator 30 can also zoom in on a specific component, for example, when a user clicks on the component using a pointing device, such as a mouse. Furthermore, the test subject indicator 30 can add properties to a component, for example, a link to a help file, a part number, inventory information regarding the component, or the like.

The test equipment illustrator 32 can illustrate a location on the schematic where a test equipment connection is required. For example, a test equipment illustrator 32 can highlight or otherwise locate a location or multiple locations where electrical connectors, pins, clamps, or the like of a piece of test equipment are to be connected to a vehicle component or electrical connector. The test equipment illustrator 32 can further illustrate required test equipment, such as a digital multimeter, in the schematic. This can aide a vehicle technician in quickly and efficiently connecting test equipment for a diagnostic test procedure.

The diagnostic schematic formatter 34 can format the originally stored schematic or a modified schematic for display on the display device 25. For example, the diagnostic schematic formatter 34 can include an SVG viewer or cooperate with an SVG viewer to display the interactive diagnostic schematic 10.

Furthermore, the feedback receiver 36 can receive feedback indicating that a diagnostic test procedure, test step or other action has been performed. For example, the feedback receiver 36 can receive a data signal from a vehicle onboard computer, a data signal from test equipment associated with the vehicle, or a user input by way of the input/output device 26. In some embodiments, the feedback can be received by direct manipulation, for example, a user can select a portion of the schematic using a mouse or the equivalent. For example, a user can “click” on a wire, a component, or another test subject within a schematic currently displayed on the screen, and the feedback receiver 36 can uniquely identify the selected test subject.

The feedback receiver can then alert the corresponding routine or component of the interactive diagnostic schematic generator 20. For example, in response to the feedback, the interactive diagnostic schematic generator 20 can remove or discontinue the indication of the test subject in the schematic. That is to say, the test subject indicator 30 can remove or discontinue the highlighting, fading, graying out, animation or other indication of the test subject in the diagnostic schematic 10. In some embodiments, online help can be accessed by way of direct manipulation of displayed objects in the schematic.

In addition, in response to the feedback received by the feedback receiver 36, the test subject indicator 30 can mark the test subject to indicate that a diagnostic procedure, test step or other action has been performed on the test subject. Once again, the test subject indicator 30 can use highlighting, shading, fading, graying out, animation of the test subject or the like to indicate that the action has been performed. For example, the marking style used to mark the test subject to indicate that the action has been performed can be visually distinct from the indicating style used to indicate the test subject on which an action is required.

Additionally, the marking style implemented by the test subject indicator 30 can indicate that the result of the diagnostic procedure, test step or other action has validated the test subject—that is to say, the test subject passed the test or functioned normally. Otherwise, the marking style can indicate that the result invalidated, or faulted, the test subject—that is to say, the test subject failed the test or did not function normally.

Figure 3:
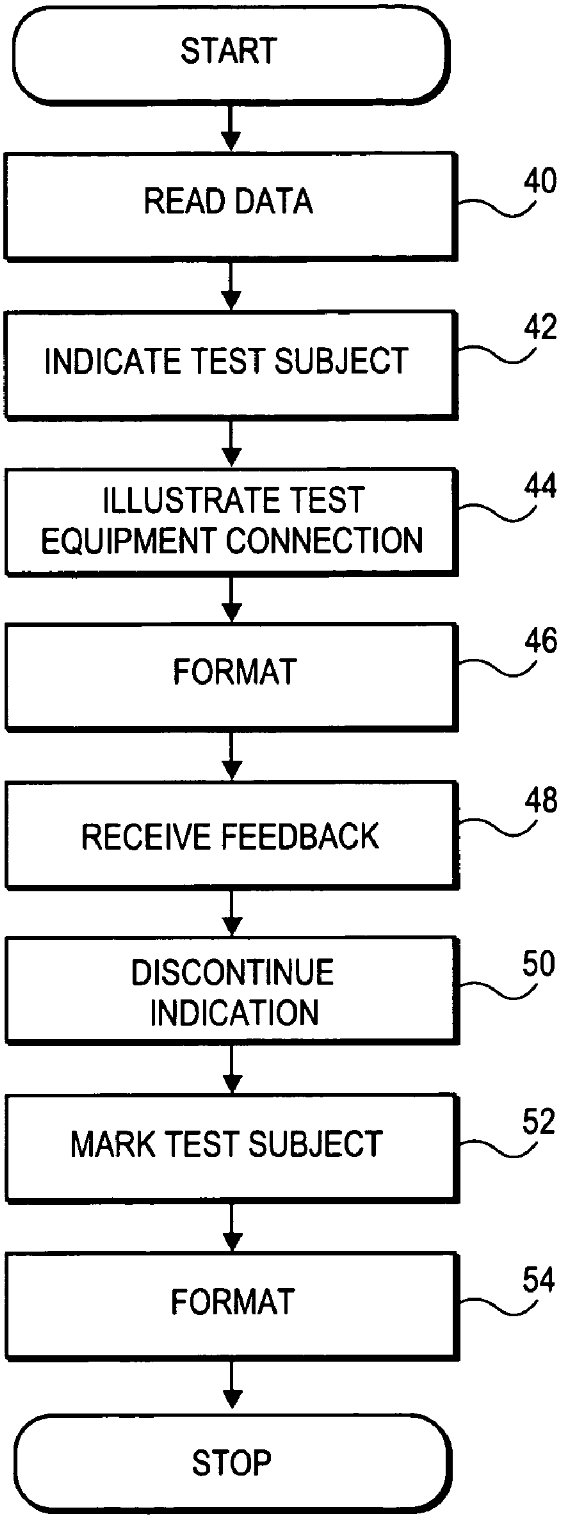
FIG. 3 is a flowchart illustrating steps that may be followed to generate an interactive diagnostic schematic in accordance with one embodiment or the method or process.

FIG. 3 is a flowchart illustrating a sequence of steps that can be performed in order to generate an interactive diagnostic schematic to illustrate a vehicle diagnostic test procedure for a vehicle. The process can begin by proceeding to step 40, “Read Data,” in which a schematic data file, such as an SVG format file, can be read from a memory associated with a processor. After the schematic data file has been read, in step 42, “Indicate Test Subject,” a test subject in the schematic upon which an action is required, such as a diagnostic test procedure or test step, can be indicated. For example, the test subject can be highlighted, shaded, faded, grayed out or animated, as explained above. The animation can include, for example, flashing or blinking, motion, zooming, or the like.

Next, in step 44, "Illustrate Test Equipment Connection," locations where test equipment connections are required for a test procedure can be illustrated in the schematic, as described above. Then, in step 46, "Format," the schematic can be formatted for display on a display device associated with the processor. In this manner, the interactive diagnostic schematic can be displayed for a vehicle technician to aid efficient performance of diagnostic procedures in a diagnostic test sequence.

In step 48, "Receive Feedback," feedback can be received indicating that the action has been performed and, in step 50, "Discontinue Indication," the indication of the test subject can be removed or discontinued in response to the feedback, as described above.

At this point, in step 52, "Mark Test Subject," the test subject can be marked in the schematic to indicate that the action has been performed. As described above, the marking style can be visually distinct from the indicating style, and the marking can further indicate that the result of the action either validated or invalidated the test subject. Thus, the marking can indicate vehicle components that have been tested successfully or that have failed a diagnostic test procedure. Then, in step 54, "Format," the schematic can be formatted or reformatted for display on the display device with the test subject marked to indicate that the action has been performed, as explained above.

Figure 4:
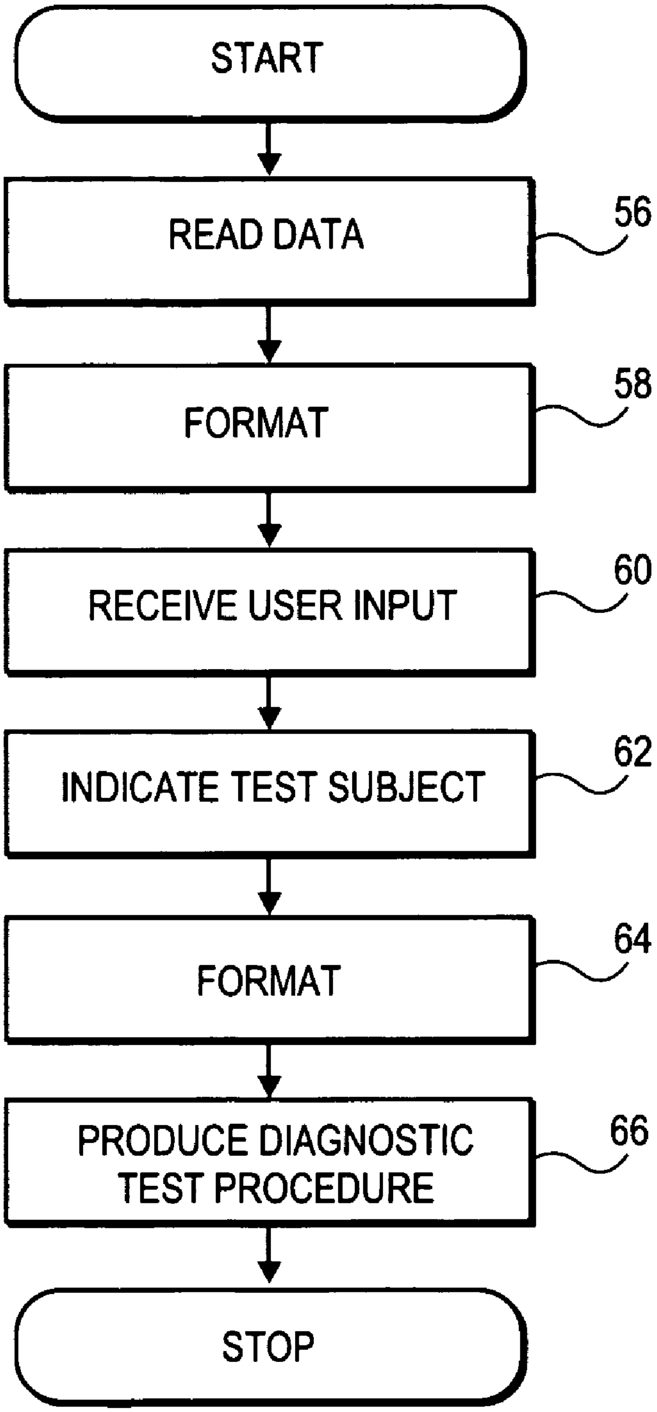
FIG. 4 is a flowchart illustrating steps that may be followed to generate an interactive diagnostic schematic to aid the authoring of a diagnostic test procedure.

FIG. 4 is a flowchart illustrating a sequence of steps that can be performed to generate an interactive diagnostic schematic to aid the authoring, or creation, of a diagnostic test procedure, such as a failure mode test. The process can begin by proceeding to step 56, "Read Data," in which a schematic data file can be read from a memory, as described above. Then, in step 58, "Format," the schematic can be formatted for display on a display device associated with a processor, as explained above.

Next, in step 60, "Receive User Input," a user input indicating a test subject can be received from a user, such as an expert vehicle technician, or author, using a pointing device. Then, in step 62, "Indicate Test Subject," the test subject can be indicated in the schematic by use of highlighting, for example, shading, fading, graying out or animation, as explained above. In this manner, the author can select by way of the displayed interactive diagnostic schematic a vehicle component, electrical connector, wire, or the like, for which to author a new or modified diagnostic test procedure.

In turn, in step 64, "Format," the schematic can be formatted or reformatted for display on the display device with the user-selected test subject indicated. At this point, in step 66, "Produce Diagnostic Test Procedure," control can pass to an authoring module to allow the user, for example, an expert vehicle technician, to author a new or modified diagnostic test procedure.

An example of an authoring module that can produce a vehicle diagnostic sequence for use with a vehicle diagnostic system is disclosed in U.S. patent application Ser. No. 11/038,118, entitled "Authoring Diagnostic Test Sequences Apparatus and Method," filed by Fountain, et al. on Feb. 8, 2005, the disclosure of which is hereby incorporated by reference in its entirety.

FIGS. 2, 3 and 4 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 2 depicts the apparatus of one embodiment including several of the key components of a general purpose computer by which an embodiment of the present invention may be implemented. Those of ordinary skill in the art will appreciate that a computer can include many more components than those shown in FIG. 2. However, it is not necessary that all of these generally conventional components be shown in order to disclose an illustrative embodiment for practicing the invention. The general purpose computer can include a processing unit 22 and a system memory 24, which may include random access memory (RAM) and read-only memory (ROM). The computer also may include nonvolatile storage memory, such as a hard disk drive, where additional data can be stored.

An embodiment of the present invention can also include one or more input or output devices, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN), a wide area network (WAN), the Internet, or the like, and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of dynamically generating an interactive diagnostic schematic to illustrate a diagnostic test procedure for a vehicle, comprising:

illustrating a diagnostic test sequence within the diagnostic schematic, comprising:
- reading a unit of schematic data associated with the diagnostic test procedure from a memory;
- preparing an interactive graphical representation of the diagnostic schematic for display on a display device, wherein within the diagnostic schematic are included a plurality of test subjects;
- indicating a test subject among the plurality of test subjects in the diagnostic schematic upon which an action is required, wherein the test subject is configured to be user selectable from directly within the schematic;
- locating a location on the diagnostic schematic for a test equipment connection if a test equipment connection is required and illustrating that location;
- receiving a feedback indicating that the action has been performed;
- removing the indication of the test subject from the diagnostic schematic in response to the feedback;
- marking a test status of the plurality of test subjects on the plurality of test subjects within the diagnostic schematic, such that there is a visually distinct difference between which of said plurality of test subjects have been tested and which of said plurality of test subjects have not been tested; and
- guiding to a next test subject upon which a next action is required within the same diagnostic schematic.

2. The computer-implemented method of claim 1, wherein the indicating the test subject further comprises one selected from the following: changing a color of the test subject, surrounding the test subject with a highlight color, shading the test subject, fading the color of the test subject, graying out the test subject, zooming in on the test subject and animating the test subject.

3. The computer-implemented method of claim 1, wherein the schematic data is in a scalable vector graphics format.

4. The computer-implemented method of claim 1, wherein the feedback is received by way of direct manipulation of a graphical user interface.

5. The computer-implemented method of claim 1, wherein the indicating the test subject further comprises:
- marking a first test subject to indicate that a first action has been performed; and
- preparing the diagnostic schematic for display on the display device with the first test subject marked, wherein a marking style of the step of marking is visually distinct from an indicating style of the step of indicating.

6. The computer-implemented method of claim 5, wherein the marking the first test subject further indicates one selected from the following: that the result of the first action validates the first test subject and that the result of the first action invalidates the first test subject.

7. The computer-implemented method of claim 1, wherein the guiding to the next test subject further comprises:
- receiving a user input indicating the next test subject; and
- indicating the next test subject in the diagnostic schematic in response to the user input.

8. A computer program product for dynamically generating an interactive diagnostic schematic to illustrate a diagnostic test procedure for a vehicle stored on computer-readable medium encoded with instructions configured to be executed by a processor in order to perform predetermined operations, comprising:

illustrating a diagnostic test sequence, comprising:
- reading a unit of schematic data associated with the diagnostic test procedure from a memory;
- preparing an interactive graphical representation of the diagnostic schematic for display on a display device, wherein within the diagnostic schematic are included a plurality of test subjects;
- indicating a test subject among the plurality of test subjects in the diagnostic schematic upon which an action is required, wherein the test subject is configured to be user selectable from directly within the schematic;
- locating a location on the diagnostic schematic for a test equipment connection if the test equipment connection is required and illustrating that location;
- receiving a feedback indicating that a first action has been performed;
- removing the indication of the test subject from the diagnostic schematic in response to the feedback;
- marking a test status of the plurality of test subjects on the plurality of test subjects within the diagnostic schematic, such that there is a visually distinct difference between which of said plurality of test subjects have been tested and which of said plurality of test subjects have not been tested; and
- guiding to a next test subject upon which a next action is required within the same diagnostic schematic.

9. The computer program product of claim 8, wherein the indicating the test subject further comprises one selected from the following: changing a color of the test subject, surrounding the test subject with a highlight color, shading the test subject, fading the color of the test subject, graying out the test subject, zooming in on the test subject and animating the test subject.

10. The computer program product of claim 8, wherein the reading further includes reading schematic data in a scalable vector graphics format.

11. The computer program product of claim 8, wherein the feedback is received by way of direct manipulation of a graphical user interface.

12. The computer program product of claim 8, wherein the indicating further comprises:
- marking a first test subject to indicate that a first action has been performed; and
- preparing the diagnostic schematic for display on the display device with the first test subject marked, wherein a marking style of the step of marking is visually distinct from an indicating style of the step of indicating.

13. The computer program product of claim 12, wherein the marking the first test subject further indicates one selected from the following: that the result of the first action validates the first test subject and that the result of the first action invalidates the first test subject.

14. A diagnostic tool for dynamically generating an interactive diagnostic schematic to illustrate a diagnostic test procedure for a vehicle, comprising:

a schematic reader configured to read a unit of schematic data associated with the diagnostic test procedure from a memory;

a test subject indicator configured to indicate a test subject in the diagnostic schematic upon which an action is required, wherein the test subject is configured to be user selectable from directly within the schematic and configured to mark a test status of a plurality of test subjects within the diagnostic schematic, such that there is a visually distinct difference between which of said plurality of test subjects have been tested and which have not been tested, and further configured to guide to a next test subject upon which a next action is required within the same diagnostic schematic;

a feedback receiver configured to receive a feedback indicating that a first action has been performed, wherein the test subject indicator is further configured to remove the indication of a first test subject from the diagnostic schematic in response to the feedback; and a diagnostic schematic formatter configured to illustrate a diagnostic test sequence and to prepare an interactive graphical representation of the schematic for display on a display device with the test subject to be tested indicated.

15. The diagnostic tool of claim 14, wherein the test subject indicator is further configured to indicate first test subject by way of one selected from the following: changing a color of the first test subject, surrounding the first test subject with a highlight color, shading the first test subject, fading the color of the first test subject, graying out the first test subject, zooming in on the first test subject and animating the first test subject.

16. The diagnostic tool of claim 14, wherein the schematic data reader is further configured to read schematic data in a scalable vector graphics format.

17. The diagnostic tool of claim 14, further comprising a test equipment illustrator configured to illustrate a location of a test equipment connection in the schematic.

18. The diagnostic tool of claim 14, wherein the feedback is received by way of direct manipulation of a graphical user interface.

19. The computer-implemented method of claim 1, further comprising illustrating in the diagnostic schematic a piece of test equipment for performing the test equipment connection.

20. The computer-implemented method of claim 19, wherein the illustrated piece of test equipment is a multimeter.

21. The computer-implemented method of claim 19, further comprising receiving feedback from the test equipment and using that feedback to perform said marking of the test status.

22. The computer-implemented method of claim 1, wherein the plurality of test subjects being an interactive graphical representation within the graphical representation of the schematic, providing a two way communication for input and output through feedback.

23. The computer-implemented method of claim 1, wherein the feedback received by way of direct manipulation of the graphical representation of the schematic and the test subjects.

* * * * *